United States Patent
Subramanian et al.

(10) Patent No.: US 7,358,215 B1
(45) Date of Patent: Apr. 15, 2008

(54) QUATERNARY AMMONIUM SALTS AS THICKENING AGENTS FOR AQUEOUS SYSTEMS

(75) Inventors: Shankar Subramanian, Dublin, OH (US); Cenk Burgazli, Cardington, OH (US); Yun-Peng Zhu, Columbia, OH (US); Shawn Zhu, Dublin, OH (US); Dave Feuerbacher, Westerville, OH (US)

(73) Assignee: Akzo Nobel Surface Chemistry LLC, Chicago, IL (US)

( * ) Notice: Subject to any disclaimer, the term of this patent is extended or adjusted under 35 U.S.C. 154(b) by 853 days.

(21) Appl. No.: 10/070,282

(22) PCT Filed: Sep. 1, 2000

(86) PCT No.: PCT/US00/24142

§ 371 (c)(1), (2), (4) Date: Apr. 15, 2002

(87) PCT Pub. No.: WO01/18147

PCT Pub. Date: Mar. 15, 2001

Related U.S. Application Data

(60) Provisional application No. 60/152,662, filed on Sep. 7, 1999.

(51) Int. Cl.
C09K 8/68 (2006.01)
E21B 43/26 (2006.01)
B01F 3/08 (2006.01)
B01F 17/00 (2006.01)

(52) U.S. Cl. ............... 507/240; 507/244; 507/922; 166/308.2; 516/59

(58) Field of Classification Search ............... 507/240, 507/244, 922; 166/308.2; 516/59
See application file for complete search history.

(56) References Cited

U.S. PATENT DOCUMENTS

| | | | |
|---|---|---|---|
| 2,748,139 A | 5/1956 | Scudi et al. ............. 260/295.5 |
| 3,275,552 A * | 9/1966 | Kern et al. ................. 507/240 |
| 3,306,858 A | 2/1967 | Oberle ........................ 252/99 |
| 3,323,593 A | 6/1967 | Foshee et al. ................ 166/42 |
| 3,625,284 A | 12/1971 | Gogarty et al. ............. 166/273 |
| 3,637,015 A | 1/1972 | Holm ........................ 166/273 |
| 3,637,016 A | 1/1972 | Holm ........................ 166/273 |
| 3,670,819 A | 6/1972 | Dauben et al. ......... 166/305 R |
| 3,677,343 A | 7/1972 | Showalter .................. 166/252 |
| 3,797,574 A | 3/1974 | Feuerbacher et al. ....... 166/274 |
| 3,849,348 A | 11/1974 | Hewitt et al. ............... 252/547 |
| 3,920,074 A | 11/1975 | Sarem ....................... 166/274 |
| 4,061,580 A | 12/1977 | Jahnke .................. 252/8.55 R |
| 4,071,457 A | 1/1978 | Meister ................. 252/8.55 D |
| 4,077,990 A | 3/1978 | Prodo et al. ............. 260/404.5 |
| 4,107,328 A | 8/1978 | Michaels .................... 424/316 |
| 4,113,631 A | 9/1978 | Thompson ................. 252/8.55 |
| 4,120,356 A | 10/1978 | Meister ....................... 166/267 |
| 4,148,736 A | 4/1979 | Meister ................. 252/8.55 R |
| 4,168,302 A * | 9/1979 | Schoenberg ............. 424/70.19 |
| 4,284,435 A | 8/1981 | Fox ............................... 134/2 |
| 4,287,950 A | 9/1981 | Baker et al. ................ 166/273 |
| 4,464,268 A | 8/1984 | Schievelbein .......... 252/8.55 B |
| 4,514,310 A | 4/1985 | Heilweil ................ 252/8.55 R |
| 4,587,030 A | 5/1986 | Casey .......................... 252/92 |
| 4,591,447 A | 5/1986 | Kubala .................. 252/8.55 C |
| 4,595,511 A | 6/1986 | Seybold et al. ........ 252/8.55 B |
| 4,604,424 A | 8/1986 | Cole et al. ................... 524/862 |
| 4,624,314 A | 11/1986 | Clark ......................... 166/271 |
| 4,654,158 A | 3/1987 | Shepherd, Jr. ............... 252/91 |
| 4,668,408 A | 5/1987 | McClaflin et al. ........ 252/8.552 |
| 4,669,544 A | 6/1987 | Nimerick .................... 166/300 |
| 4,690,217 A | 9/1987 | Taggart et al. .............. 166/274 |
| 4,725,372 A * | 2/1988 | Teot et al. .................. 507/129 |
| 4,735,731 A | 4/1988 | Rose et al. |
| 4,737,296 A | 4/1988 | Watkins .................... 252/8.553 |
| 4,745,976 A | 5/1988 | Harwell et al. ............. 166/273 |
| 4,772,644 A | 9/1988 | Itoh et al. ................... 523/443 |
| 4,775,489 A | 10/1988 | Watkins et al. .......... 252/8.552 |
| 4,782,893 A | 11/1988 | Thomas ...................... 165/185 |
| 4,806,256 A | 2/1989 | Rose et al. .................. 252/71 |
| 4,898,725 A * | 2/1990 | Hoeffkes et al. .......... 424/70.13 |
| 4,960,934 A | 10/1990 | Smith et al. ................. 564/298 |
| 4,979,564 A | 12/1990 | Kalpakci et al. ............. 166/273 |
| 5,019,281 A * | 5/1991 | Singer et al. .............. 252/8.63 |
| 5,049,943 A | 9/1991 | Menjo et al. ................ 355/284 |

(Continued)

FOREIGN PATENT DOCUMENTS

EP 0 070 076 A2 1/1981

(Continued)

OTHER PUBLICATIONS

Muzyczko, Journal of the American Oil Chemists Society, vol. 45, pp. 720-725, (1968).*

(Continued)

*Primary Examiner*—Randy Gulakowski
*Assistant Examiner*—Timothy J. Kugel
(74) *Attorney, Agent, or Firm*—Ralph J. Mancini

(57) ABSTRACT

This invention relates to the use of alkyl amido quaternary ammonium salts, and formulations thereof, as thickening agents in aqueous based fluids, especially those used in oil field applications. The quaternary ammonium salts of the present invention exhibit improved gelling characteristics.

23 Claims, No Drawings

U.S. PATENT DOCUMENTS

| | | | |
|---|---|---|---|
| 5,075,038 A | 12/1991 | Cole et al. .................. 252/514 |
| 5,089,151 A | 2/1992 | Hall et al. |
| 5,101,903 A | 4/1992 | Llave et al. ................ 166/294 |
| 5,104,556 A | 4/1992 | Al-Yazdi ................ 252/8.552 |
| 5,149,463 A | 9/1992 | Peterson ................ 252/301.21 |
| 5,246,072 A | 9/1993 | Frazier, Jr. et al. ......... 166/273 |
| 5,246,698 A | 9/1993 | Leshchiner et al. ...... 424/78.08 |
| 5,258,137 A | 11/1993 | Bonekamp et al. |
| 5,263,540 A | 11/1993 | Dovan et al. ............... 166/278 |
| 5,374,361 A | 12/1994 | Chan .......................... 507/211 |
| 5,388,646 A | 2/1995 | Hensley ...................... 166/271 |
| 5,441,664 A | 8/1995 | Blanvalet et al. ........... 252/117 |
| 5,458,197 A | 10/1995 | Chan .......................... 166/304 |
| 5,458,198 A | 10/1995 | Hashemi et al. ............ 166/312 |
| 5,462,698 A | 10/1995 | Kobayakawa et al. ...... 252/586 |
| 5,501,276 A | 3/1996 | Weaver et al. .............. 166/291 |
| 5,551,516 A | 9/1996 | Norman et al. |
| 5,564,500 A | 10/1996 | Rogers et al. .............. 166/312 |
| 5,580,849 A | 12/1996 | Dyet et al. .................. 510/427 |
| 5,595,243 A | 1/1997 | Maki, Jr. et al. ......... 166/177.2 |
| 5,602,083 A | 2/1997 | Gabrysch et al. ........... 507/200 |
| 5,607,905 A | 3/1997 | Dobson, Jr. et al. ........ 507/211 |
| 5,627,144 A | 5/1997 | Urfer et al. ................. 507/211 |
| 5,670,460 A | 9/1997 | Neely et al. ................ 507/203 |
| 5,678,631 A | 10/1997 | Salisbury et al. ........... 166/304 |
| 5,678,632 A | 10/1997 | Moses et al. ............... 166/307 |
| 5,781,412 A | 7/1998 | de Sorgo .................... 361/704 |
| 5,797,456 A | 8/1998 | Mokadam ................... 166/307 |
| 5,830,831 A | 11/1998 | Chan et al. ................. 507/211 |
| 5,866,040 A * | 2/1999 | Nakama et al. ............... 516/22 |
| 5,919,312 A | 7/1999 | Wierenga et al. ............. 134/34 |
| 5,964,295 A | 10/1999 | Brown et al. ............... 166/308 |
| 5,977,032 A | 11/1999 | Chan .......................... 507/211 |
| 5,979,555 A * | 11/1999 | Gadberry et al. ......... 166/270.1 |
| 5,979,557 A | 11/1999 | Card et al. .................. 166/300 |
| 5,998,347 A | 12/1999 | D'Ambrogio et al. ...... 510/237 |
| 6,112,814 A | 9/2000 | Chan et al. ................. 166/304 |
| 6,153,572 A | 11/2000 | Stamm ....................... 510/193 |
| 6,169,058 B1 | 1/2001 | Le et al. ..................... 507/222 |
| 6,177,388 B1 | 1/2001 | Cheung et al. ............. 510/101 |
| 6,239,183 B1 | 5/2001 | Farmer et al. .............. 516/102 |
| 6,244,343 B1 | 6/2001 | Brothers et al. ............ 166/293 |
| 6,258,859 B1 | 7/2001 | Dahayanake et al. |
| 6,277,803 B1 | 8/2001 | Tarng et al. ................ 510/237 |
| 6,306,800 B1 | 10/2001 | Samuel et al. .............. 507/129 |
| 6,313,084 B1 | 11/2001 | D'Ambrogio et al. ...... 510/425 |
| 6,350,721 B1 | 2/2002 | Fu et al. ..................... 507/242 |
| 6,399,799 B1 | 6/2002 | Pereira et al. ................ 554/52 |
| 6,412,561 B1 * | 7/2002 | Brown et al. ............ 166/308.2 |
| 6,435,277 B1 | 8/2002 | Qu et al. ..................... 166/281 |
| 6,506,710 B1 | 1/2003 | Hoey et al. ................. 507/242 |
| 6,605,570 B2 * | 8/2003 | Miller et al. ................ 507/211 |
| 6,645,912 B1 | 11/2003 | Mille et al. ................. 504/206 |
| 6,703,352 B2 | 3/2004 | Dahayanake et al. ....... 507/241 |
| 6,831,108 B2 | 12/2004 | Dahanayake et al. ......... 516/69 |
| 6,964,940 B1 * | 11/2005 | Treybig et al. ............. 507/129 |
| 6,972,274 B1 | 12/2005 | Slikta et al. ................ 507/240 |
| 7,060,661 B2 | 6/2006 | Dobson, Sr. et al. ....... 507/245 |
| 2002/0023752 A1 * | 2/2002 | Qu et al. ..................... 166/308 |
| 2003/0019627 A1 | 1/2003 | Qu et al. ..................... 166/281 |
| 2004/0176478 A1 | 9/2004 | Dahayanake et al. ......... 516/77 |

FOREIGN PATENT DOCUMENTS

| | | |
|---|---|---|
| EP | 0 474 284 A1 | 3/1992 |
| EP | 0 835 983 B1 | 12/2003 |
| FR | 2412924 | 7/1979 |
| GB | 1 212 782 | 11/1970 |
| GB | 1 404 335 | 8/1975 |
| GB | 2 018 863 A | 10/1979 |
| GB | 2 119 358 A | 11/1983 |
| GB | 2 354 541 A | 6/2001 |
| JP | 5-93181 | 4/1993 |
| JP | 9-3491 | 1/1997 |
| JP | 10-197306 | 7/1998 |
| JP | 11-152493 | 6/1999 |
| WO | WO 94/17154 | 8/1994 |
| WO | WO 96/34078 | 10/1996 |
| WO | WO 97/33960 | 9/1997 |
| WO | WO99/32572 | 7/1999 |
| WO | WO 99/35120 | 7/1999 |
| WO | WO 00/17303 | 3/2000 |
| WO | WO 01/07010 A1 | 2/2001 |
| WO | WO 01/18147 A1 | 3/2001 |
| WO | WO 01/81499 A2 | 11/2001 |
| WO | WO 02/064945 A1 | 8/2002 |
| WO | WO 03/093641 A1 | 11/2003 |

OTHER PUBLICATIONS

Derwent Abstract of JP 9003491.
Derwent Abstract of JP 10197306.
Derwent Abstract of WO 1997033960.
Derwent Abstract of JP 11152493.
Kalur et al., "Viscosity Increase with Temperature in Cationic Surfactant Solutions Due to the Growth of Wormlike Micelles," Langmuir Nov. 22, 2005, vol. 21, No. 24, pp. 10998-11004.
Derwent Abstract of FR 2412924.
Marczak et al., "Characterization of Surfactant Gelled Fracturing Fluids," SPE 63240; pp. 1-8 (Oct. 1-4, 2000).
Nehmer et al., "Viscoelastic Gravel-Pack Carrier Fluid," SPE 17168; pp. 217-226 (Feb. 8-9, 1988).
Raghavan et al., "Highly Viscoelastic Wormlike Micellar Solutions Formed by Cationic Surfactants with Long Unsaturated Tails," Langmuir pp. 300-306 (2001).
Stewart et al., "Use of Solids-free Viscous Carrying Fluid in Fracturing Applications: An Economic and Productivity Comparison in Shallow Completions," SPE 30114; pp. 379-392 (May 15-18, 1995).
Hoffmann, "Viscoelastic Surfactant Solutions," American Chemical Society, Structure and Flow in Surfactant Solutions; Ch. 1; (1994).
Muzyczko et al., "Fatty Amidoamine Derivatives: N,N-Dimethyl-N-(3-alkylamidopropyl)amines and Their Salts," Journal of American Oil Chemists Society; pp. 720-725 (Nov. 1968).

* cited by examiner

QUATERNARY AMMONIUM SALTS AS THICKENING AGENTS FOR AQUEOUS SYSTEMS

The benefit of copending U.S. Provisional Application No. 60/152,662, filed Sep. 7, 1999 is hereby claimed.

FIELD OF THE INVENTION

This invention relates to the use of alkyl amido quaternary ammonium salts, and formulations thereof, as thickening agents in aqueous based fluids, especially those used in oil field applications. In particular, the compositions of the present invention find use as gelants in fluids used in oil recovery operations such as fracturing fluids, completion fluids, and drilling fluids, that are used in the process of recovering hydrocarbons from subterranean formations. The quaternary ammonium salts of the present invention exhibit improved gelling characteristics.

BACKGROUND OF THE INVENTION

Hydraulic fracturing is used to stimulate the production of hydrocarbons such as oil or natural gas from subterranean formations. In this process, a fracturing fluid is injected through a wellbore and propelled against the formation strata by high pressure sufficient to cause the strata to crack and fracture.

The fracturing fluid also carries what is referred to as a proppant to the fracture site. These proppant particles remain in the fracture thereby "propping" the fracture open when the well is in production. The proppant material is commonly sand, sintered bauxite, glass balls, polystyrene beads, and so forth.

Traditional fracturing fluids were polymer based fluids. Naturally occurring polysaccharides such as guar and derivatized guar, upon dissolution in water, form hydrated polymers which can be crosslinked with organometallic compounds such as borates, zirconates or titanates to form a crosslinked gel structure which increases the viscosity of the fluid. However, these crosslinked polymers can ultimately form a rubbery semi-solid material that is difficult to recover from the fracture causing reduction in the conductivity of the fracture. Peroxides and other gel breakers are therefore often utilized to break the gelled polymeric structure into smaller molecules and facilitate clean-up of the fracture site. Production of oil or gas is often dependent on the ability to clean the fracture site of such materials.

It is a widely known concept to use certain chemical agents to increase the viscosity or induce gel formation in aqueous or hydrocarbon based fluids. These gelled or thickened fluids may be referred to as viscoelastic fluids. The term viscoelastic is commonly understood to refer to a fluid that has the capability to partially return to its original non-disturbed form upon release of applied stress. It is believed that under the right conditions, i.e. concentration, counter ion, pH and so forth, that certain surfactants from rod-like or cylindrical micelles which can entangle to form these gelatinous, viscoelastic fluids in aqueous solutions.

These thickened fluids are then capable of suspending the proppant particles and carrying them to the fracture site. These gelled fluids also diminish loss of fluid into the fracture face, thereby improving the efficiency in the fracturing process and reducing the overall cost.

Viscoelastic fluids can be formed with a combination of ionic and/or non-ionic surfactants and by the incorporation of additives such as organic and/or inorganic salts. U.S. Pat. No. 5,551,516 issued Sep. 3, 1996 to Norman et al. describe surfactant based viscoelastic aqueous fluid systems useful in fracturing subterranean formations penetrated by a wellbore, and state that the fracturing fluids are useful in high temperature, high permeability formations. Norman et al. state that the preferred thickening agents are quaternary ammonium halide salts derived from certain waxes, fats and oils. The thickening agent is used iii conjunction with an inorganic water soluble salt, an organic stabilizing additive selected from the group of organic salts such as sodium salicylate. The fluids are said to be stable to a temperature of 225° F.

Various problems have been encountered with these gelled fluids in oil field applications including the lack of thermal stability of the fracturing fluids caused by the degradation of the additives or the instability of the gel upon exposure to high temperatures and/or high shear conditions. This can result in changes in the rheological properties of the gel which can ultimately affect the ability of the fluid to suspend proppant material. If proppant material is prematurely lost from the fracturing fluid it can have a detrimental effect on the fracturing treatment. Furthermore, gel instability can result in higher loss of fluid into the formation thereby diminishing the amount of fracturing that occurs. High temperatures in the formation can further impact gel stability.

For high brine solutions, i.e. those having salt concentrations of about 30 wt-% or more, polymeric materials have been used as thickeners but tend to precipitate from these high salt concentration solutions which can result in plugging and formation damage. Furthermore, the high salt concentration makes it difficult to dissolve these polymeric viscosifiers or thickeners in the solutions. Such high brine solutions are found in completion fluids used in drilling operations.

SUMMARY OF THE INVENTION

The present invention relates to improved gelling agents for use in oil field applications. In particular, the compositions find use in fracturing fluids, completion fluids and well drilling fluids.

The gelling agents of the present invention are cationic in nature and have the following general structure:

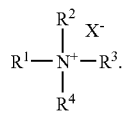

$R^1$ is alkyl amine alkylene, alkyl amido alkylene, alkyl ester alkylene where the alkyl group contains 1-26 carbon atoms and the alkylene group preferably contains 1 to 8 carbon atoms; $R^2$ and $R^3$ are each alkyl, hydroxy alkyl, polyalkoxy with the degree of polymerization ranging from 2-30, alkyl sulfonate, hydroxyalkyl sulfonate or alkylaryl sulfonate; $R^4$ is hydrocarbon such as alkyl, aryl, aralkyl, or alkaryl and can be saturated or unsaturated; or wherein any two or $R^2$, $R^3$ and $R^4$ together with the nitrogen atom to which they are attached, form a heterocyclic ring; and X is selected from the group consisting of halides; oxo ions of phosphorous, sulfur or chloride; and various organic anionic molecules.

The surfactants of the present invention, in combination with at least one additive which may be an inorganic salt, organic salt, organic acid, alcohol or a mixture thereof, form stable gels in aqueous environments.

The present invention further relates to a method of fracturing a subterranean formation comprising the steps of providing a thickened fracturing fluid as described above, and injecting the aqueous fracturing fluid through a wellbore and against a subterranean formation at a pressure sufficient to initiate and or extend a fracture into the formation.

The present invention further relates to a method of suspending particles in a thickened aqueous liquid by providing an aqueous medium and adding to the aqueous medium an effective amount of at least one surfactant and at least one counterion selected from the group consisting of organic salts, inorganic salts, organic acids, alcohols, and mixtures thereof, sufficient to increase the viscosity of said aqueous medium. The surfactant has the general structure as provided above. The thickened aqueous fluid is capable of suspending solid particulate matter. The thickened fluid may then be further used to transport the solid particulate matter to a remote location.

This type of method is useful in well-drilling operations, coil-tubing operations, construction operations, mining operations, and so forth, where it is desirable to remove solid matter from the site of operation.

The present invention further relates to a method of reducing the friction of an aqueous liquid as it passes through a conduit by adding to the aqueous liquid, at least one surfactant of the present invention, and at least one additive which is an inorganic salt, organic salt, organic acid, an alcohol, or a mixture thereof. The amount of surfactant and additive added to the aqueous liquid are sufficient to reduce the friction of the aqueous liquid as it passes through the conduit.

The present invention further relates to an oil field high brine oil completion fluid comprising about 30 wt-% to about 70 wt-% of at least one inorganic or organic salt and about 0.1 wt-% to about 4 wt-% of at least one cationic surfactant having the following general structure:

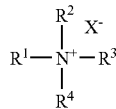

wherein $R^1$ is alkyl amine alkylene or alkyl amido alkylene, $R^2$ and $R^3$ are each alkyl, hydroxy alkyl, polyalkoxy with the degree of polymerization ranging from 2 to 30, hydroxyl alkyl sulfonate, alkyl sulfonate or alkylarylsulfonate; $R^4$ is hydrocarbon, saturated or unsaturated; or wherein any two of $R^2$, $R^3$ and $R^4$, together with the nitrogen atom to which they are attached, form a heterocyclic ring; and X is selected from the group consisting of halides; oxo ions of phosphorous, sulfur or chloride; and organic anions.

A counterion, i.e. an inorganic salt, organic salt, inorganic acid, alcohol, or mixture thereof, is optional in the case of the high brine completion fluid.

These compositions have been found to provide a reversible thickening phenomenon whereby with increasing temperature, the viscosity increases. However, when the heat source is removed, and the temperature drops, the viscosity will again decrease.

DETAILED DESCRIPTIONS OF THE PREFERRED EMBODIMENTS

The monomeric surfactants of the present invention in the presence of organic or inorganic activators or gel promoters, can be used as thickening agents in aqueous based systems.

The surfactant ions of the present invention are preferably cationic and have the following general structure:

where $R^1$ is alkyl amine alkylene, alkyl amido alkylene, alkyl ether alkylene or alkyl ester alkylene where the alkyl group contains 1-26 carbon atoms and the alkylene group preferably contains 1 to 8 carbon atoms; $R^2$ and $R^3$ are each alkyl, hydroxy alkyl, polyalkoxy with the degree of polymerization ranging from 2-30, alkyl sulfonate, hydroxyalkyl sulfonate or alkylaryl sulfonate; $R^4$ is hydrocarbon such as alkyl, aryl, aralkyl, alkaryl and can be saturated or unsaturated; or wherein any two of $R^2$, $R^3$ and $R^4$, together with the nitrogen atom to which they are attached, form a heterocyclic ring containing 2 to 5 carbon atoms and 1 to 6 sulfur atoms such as sulfur (S), nitrogen (N), oxygen (O) or silicon (Si); and X is selected from the group consisting of halides; oxo ions of phosphorous, sulfur or chloride; and various organic molecules.

In some preferred embodiments of the present invention, $R^1$ is alkyl amine alkylene or alkyl amido alkylene, and or $R^2$ and $R^3$ are each alkyl or hydroxy alkyl.

Examples of suitable alkyl groups, $R^2$, $R^3$ or $R^4$ include methyl, ethyl, propyl, butyl, hexyl, alkyl, benzyl, vinyl benzyl, and the like, including iso-propyl, iso-butyl, sec-butyl, tert-butyl, and so forth. Examples of suitable hydroxy alkyl groups include 2-hydroxyethyl-2-hydroxypropyl and 2,3-dihydroxypropyl. Examples of heterocyclic rings which may be formed by combination of two of $R^2$, $R^3$ and $R^4$ include morpholine, piperidine, piperazine, and so forth. Polyalkoxy groups are preferably ethyl, propyl or butyl.

Alkyl sulfonate may also be referred to as sulfobetaines and hydroxyalkyl sulfonates may also be referred to as sultaines. An example of a sulfobetaine is propyl sulfonate and an example of a sultaine is 2-hydroxypropyl sulfonate.

The thickening agent is employed in an amount which in combination with the other ingredients is sufficient to increase the viscosity of the aqueous fluid enough to maintain proppant in suspension during fluid placement.

Preferably, the surfactants of the present invention are alkyl amidoalkyltrialkyl ammonium quaternary salts and have the following general structure:

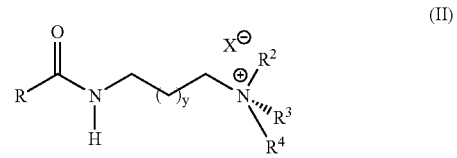

$R^2$ and $R^3$ are alkyl and preferably have from 1 to 8 carbon atoms; hydroxy alkyl preferably having from 1 to 8 carbon atoms; polyalkoxy including ethyl, propyl and butyl with the degree of polymerization ranging from 2 to 30; hydroxyalkyl sulfonate, i.e. sultaine; alkyl sulfonate, i.e. sulfobetaine; alkylarylsulfonate; $R_4$ is hydrocarbon and can be alkyl, aryl, aralkyl, alkaryl, saturated or unsaturated; or wherein any of $R^2$, $R^3$ and $R^4$, together with the nitrogen atom to which they are attached, form a heterocyclic ring containing 2-5 carbon atoms and 1-6 hetero atoms such as sulfur (S), nitrogen (N), oxygen (O), and silicon (Si); R is a saturated or unsaturated alkyl having from 1 to 30 carbon atoms, preferably from about 6 to 26 carbon atoms and most preferably from about 12 to 22 carbon atoms; y is an integer from 0 to 12, and preferably from 1 to 12; and X is defined above. Suitable R groups include coco, palmityl, stearyl, oleyl, erucyl, as well as other saturated or unsaturated moieties. As a general rule, although other factors affect stability as well, the higher the number of carbon atoms in R, the better the stability of the resultant gel.

In a specific preferred embodiment y is 1 and X is chloride, and the surfactant is an alkylamidopropyltrialkyl ammonium quaternary chloride having the following general structure:

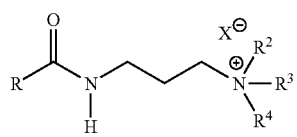
(III)

where R is erucyl (22 carbon unsaturated fatty acid chain); $R^2$, $R^3$, and $R^4$ are methyl; and y is 1. X is preferably chloride.

These types of compounds are obtained by quaternization of a corresponding alkylamidopropyltrimethylamide with methylene chloride, ethyl chloride, benzyl chloride, vinyl chloride, butyl chloride, methyl sulfate, chlorohydroxyalkylsulfonate, chloroalkylsulfonates and so forth, and mixtures thereof.

The long chain alkyl groups, R, are hydrophobic in nature and are generally derived from a fatty acid. The fatty carboxylic acid is reacted with an amine to form the amide. These long chain alkyl groups are generally derived from the fatty acids and include cetyl, oleyl, stearyl, erucyl, and the derivatives of tallow, coco, soya and rapeseed oils.

In a preferred embodiment of the present invention, the quaternary ammonium salt is erucyi amidopropyltrmiethyl ammonium quaternary salt.

In another embodiment, the surfactant is an amidopropylmorpholine quaternary salt having the following general structure:

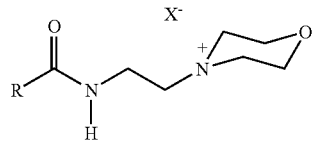
(IV)

R and X are defined as above.

One specific surfactant of this particular structure is isosterylamidopropylmorpholine lactate.

Examples of other useful quaternary salts generally include the following structures:

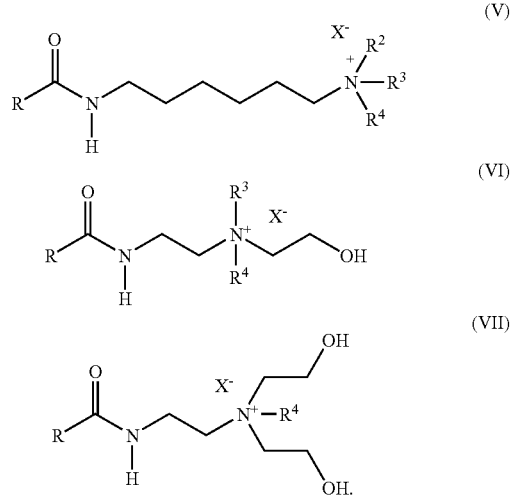

R, $R^2$, $R^3$, $R^4$ and X are as defined above. Preferably, R has about 6 to about 26 carbons and most preferably R has about 12 to 24 carbon atoms. As stated above, it has been found to be a general rule that R groups having a higher number of carbon atoms, result in a gel having better thermal stability. A specific example of structure VII, above, is dimethylalkylglycerolammonium chloride.

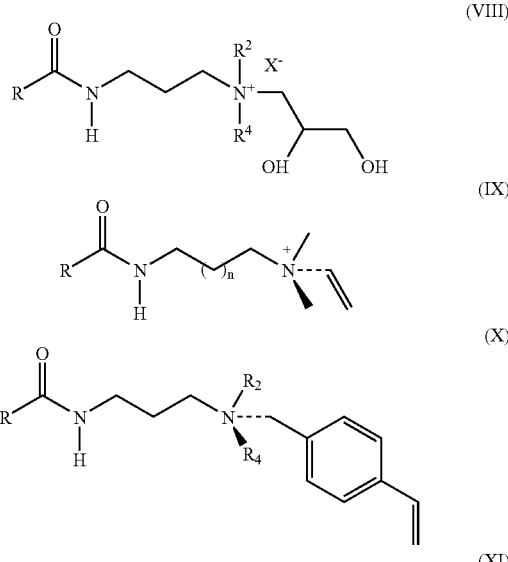

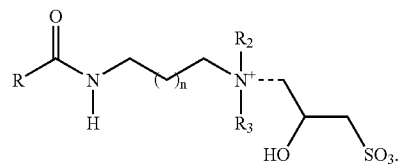

Where R, $R^2$, $R^3$ and $R^4$ are defined as above.

X may be halides; oxo ions of phosphorous, sulfur or chloride; and various organic anions, including chlorides, bromides, iodides, oxides of phosphorous, hypochlorides, phosphates, phosphites, oxides of sulfur, sulfates, sulfites, sulfonates, phosphates, acetates, carboxylates, chlorates, perchlorates, salicylates, phthalates, lactates, maleates, glycinates, citrates, citric acid, lactic acid, salicylic acid, phthalic acid, benzoic acid, naphthoic acid, amino acids, and so forth.

The concentration of the surfactant is preferably from about 0.05% to about 10% by weight of the fluid, more preferably from about 0.05% to about 6%, even more preferably from about 0.1% to about 5%, even more preferably from about 0.2% to about 4% and most preferably from about 0.5% to about 4%.

The surfactants of the present invention are rheologically stable up to temperatures of about 300° F. (about 149° C.). In some specific embodiments, the surfactants are stable up to temperatures of about 110° C. or 225° F., to about 275° F. (about 135° C.). It is important to note, however, that the gels can be used at low temperatures, i.e. 25° C., as well as in the operations where the temperature is high.

The gelation is assisted by the presence of an activator or gel promoter. These are often referred to in the art as counterions or additives. An organic acid, a salt, either organic or inorganic an alcohol, or any combination thereof, may be added as an activator or gel promoter so as to increase the viscosity of the fluid or in the development of the gel. Such additives can also aid in maintaining the stability of the geologic formation to which the fluid is exposed. The use of such compounds to improve the thickening characteristics of the fluid, are known to one of skill in the art. The compounds are chosen such that the thickening agent is compatible with the electrolyte to avoid the formation of undesirable precipitates. While some gelants, such as the sultaines or sulfobetaines, have been found to thicken or gel the aqueous fluids without the presence of the counterions, the gel stability has been found to be poor.

The organic salts useful herein are typically water soluble compounds involving a metal or an amine salt of an organic anion. Organic anions include salicylates, phthalates, naphthalates, sulfates, sulfonates, lactates, glycinates, citrates, carboxylates, benzoates, chlorobenzoates, phenates, acetates, sulfobetaines, hydroxysultaines, and so forth. Preferably, sulfates and sulfonates are used in the present invention, and in particular, those having aromatic groups such as xylene or toluene are preferred. Specific examples include xylene sulfonate, p-toluene sulfonate, naphthalene sulfonate, hydroxynaphthalene sulfonate, ethoxylauryl sulfate, methyl sulfate, ethyl sulfate, and so forth.

The organic acids useful herein include citric acids, lactic acids, salicylic acids, sulfonic acids, carboxylic acids, salicylic acids, benzoic acids, phthalic acids, naphthoic acids, and so forth. Specific examples include 3-hydroxy 2-naphthoic acid, 5-hydroxy-1-naphthoic acid, 7-hydroxy-2-naphthoic acid, 1,3-dihydroxy-2-naphthoic acid, 4-amino-5-hydroxy-1-naphthalene sulfonic acid, 2-amino-1-naphthalene sulfonic acid, and so forth.

The organic acids or salts may be modified with alkyl, ether, alpha-olefin, alkoxylates including ethoxylates, aromatic groups, hydroxyl, amino, thio and so forth. A preferably class of organic counter ion is the sulfonate ion. These organic acids or salts are useful in the aqueous medium from about 0.1% to about 5% by weight of the composition and preferably from about 0.2% to about 1% by weight of the composition.

The alcohols useful herein are preferably medium to long chain alcohols and may be alkanols or alcohol alkoxylates, i.e. alcohol ethoxylates. Alcohols are useful at a concentration in the aqueous medium of about 0.1% to about 4% by weight of the composition and preferably from about 0.9% to about 2% by weight of the composition.

Inorganic salts or small quaternary ammonium salts such as tetramethyl ammonium chloride, are also useful to the present invention. Preferably, the salts will be salts of sodium, potassium, ammonium, calcium, magnesium, zinc and so forth. These ions preferably will be in combination with a halide ion. More specifically, the inorganic salt may include potassium chloride, ammonium chloride, sodium chloride, magnesium chloride, calcium chloride, calcium bromide, and so forth. These inorganic salts both aid in the development of the gel, and assist in maintaining stability of the geologic formation to which the fluid is exposed. These inorganic salts are useful at a concentration in the aqueous medium from 0% to about 10% by weight, preferably from 1% to about 6%. The concentration of the counterion or additive appears to be somewhat dependent on the size of the molecule, and that larger molecules may be added in lower concentrations.

Specific examples of such counter ions include chloride, bromide, methyl sulfate, ethyl sulfate, xylene sulfonate, p-toluene sulfonate, naphthalene sulfonate, hydroxynaphthalene sulfonates and carboxylates, 4-amino-5-hydroxy-1-naphthalene sulfonic acid, 2-amino-1-naphthalene sulfonic acid, 3-hydroxy-2-naphthenic acid, ethoxylated lauryl sulfate, sulfobetaines, 5-hydroxy-1-naphthoic acid, 6-hydroxy-1-naphthoic acid, 7-hydroxy-1-naphthoic acid, 3-hydroxy-2-naphthoic acid, 5-hydroxy-2-naphthoic acid, 7-hydroxy-2-naphthoic acid, 1,3-dihydroxy-2-naphthoic acid, 3,4-dichlorobenzoate, and so forth.

Preferably, at least one organic counterion will be present in the compositions of the present invention. Although, in some preferred embodiments of the present invention both an inorganic salt and an organic salt, or acid, are utilized together with the quaternary ammonium cationic surfactant of the present invention. Preferably, the organic salt utilized is from the sulfonate family.

The total amount of the additives present will preferably range anywhere from about 0.1% to about 10% by weight of the total composition.

It is envisioned that the cationic surfactants of the present invention may also be used in combination with other surfactants such as anionic, non-ionic, amphoteric (or zwitterionic) surfactants.

To prepare the aqueous fracturing fluid of the present invention, the viscoelastic surfactant is added to an aqueous solution in which has been dissolved at least one water soluble inorganic salt (i.e. NaCl, KCl, $NH_4Cl$, $NH_4NO_3$, etc.), and/or at least one organic salt, organic acid, or alcohol, to provide formation stability, or to provide selective control of the loss of particle suspension properties. As stated above, the salts both aid in the development of the gel, and assist in maintaining stability of the geological formation to which the fluid is exposed.

Standard mixing procedures known to one of skill in the art may be employed in the present invention.

Other ingredients may also be added to the fluids of the present invention including defoamers, fluid loss additives, breakers, demulsifiers, and so forth, as well as other polymeric materials such as guar, guar derivatives, starch, cellulose, polyacrylates, and so forth. Additives such as these are known to one of skill in the art.

In some instances, it may be preferable to foam the fluids of the present invention by adding air, nitrogen, carbon dioxide, and a foaming agent.

These gelled or thickened fluids may be referred to as viscoelastic fluids. The term viscoelastic is commonly understood to refer to a fluid that has the capability to partially return to its original non-disturbed form upon release of applied stress. It is believed that under the right condition i.e. concentration, counter ion, pH and so forth, that certain surfactants form rod-like or cylindrical micelles which can entangle to form these gelatinous, viscoelastic fluids in aqueous solutions.

The gelled or thickened fluids of the present invention may exhibit a reversible thickening phenomenon. The fluids of the present invention may exhibit an increase in viscosity as the temperature is increased as opposed to most fluids which exhibit a decrease in viscosity as the temperature is increased. Furthermore, when the heat source is removed and the temperature decreases, the viscosity will also decrease. This phenomena, for instance, is illustrated in Table 11 of the Examples section where the viscosity of a high brine oil field completion fluid increases as the temperature is increased from about 170° F. to about 250° F. (about 76.7° C. to about 121.1° C.).

The thickened fluids of the present invention find particular utility as fracturing fluids, in compositions used in well drilling operations, for proppant and cutting transportation to and from the fracture site, and drilling fluids. These compositions have also found excellent utility in completion fluids. Completion fluids are often used in high brine situations where the salt concentration (divalent salts such as $CaCl_2$, $CaBr_2$, $ZnBr_2$, and so forth) may be as high as about 30 wt-% to about 70 wt-%. Polymeric thickeners are not as advantageously used in such high brine fluids because the polymers tend to be incompatible in these high salt environments. The polymers often precipitate from the solutions which can result in damage to the subterranean formation.

Fracturing of a subterranean formation involves pumping or injecting the aqueous fluid through a wellbore and against a subterranean formation at a flow rate and pressure sufficient to initiate and or extend a fracture into the formation. The thickened fluid also acts as a transportation vehicle for the proppant particles. These particles are carried to the fracture where they will remain in order to "prop" the fracture site open after the pressure is removed and the well goes into production. Keeping the fracture open allows for better flow of hydrocarbons from the site.

The gels of the present invention have excellent thermal stability of greater than about 65° C., preferably greater than about 80° C., more preferably greater than about 90° C., even more preferably greater than about 95° C., and most preferably greater than about 105° C. Many of the preferred surfactants have been found to have thermal stability in excess of about 225° F. (about 107° C.), although in some instances the surfactants exhibit thermal stability in the 275° F. (about 135° C.) to 300° F. (about 149° C.) range. It is preferred that the compositions exhibit stability of at least about 185° F. (about 85° C.) to about 230° F. (about 110° C.).

The gels of the present invention exhibit excellent viscosity stability to shear forces and high pressure and do not readily degrade upon exposure to high shear. This decreases the amount of fluid lost to the formation during the fracturing process when they are exposed to extreme pressures, and subsequently, leakoff rates for these fluids are low.

The excellent thermal and shear stability of the thickened fluids of the present invention make them particularly useful for fracturing operations where the temperature is high and/or the fracture site has high permeability. If the viscosity of the fluid is susceptible to decrease at high temperatures, more fluid can be lost to the formation resulting in less efficiency in the fracturing process, and more fluid lost in the formation.

The gel-like structure formed by the surfactants of the present invention may be disrupted on contact with hydrocarbon liquids, resulting in loss of viscosity. This can be advantageous for removal of the gel from the fracture once the fracturing process is complete and the well goes into production.

The gels of the present invention also find utility in other various other oil field and non-oil field applications including gravel-pack applications, in acidizing treatments, as diverting agents or lost-circulation agents, in pipeline drag reduction, in coil-tubing operations, in drilling operations as drilling fluids, as completion fluids, as foamed underbalance drilling fluids, and so forth.

The use of polymer-free viscoelastic gels in gravel-pack applications is discussed in Society of Petroleum Engineers (SPE) 17168, W. L. Nehmer, "Viscoelastic Gravel-Pack Carrier Fluids," incorporated by reference herein. The gels of the present invention provide excellent rheological properties making the especially useful in gravel-pack treatments where the rheology of the fluid is essential to achieving a good "pack". As opposed to polymer gels, the surfactant based gels of the present invention are not as susceptible to high shear forces. Further, they are less likely to damage the formation than those gels which utilize polymeric materials.

The surfactants of the present invention find utility in gelled acid systems for use in acidizing carbonate and dolamite formations for prevention of loss of fluid in the formation due to the presence of natural fissures and cracks. The systems of the present invention provide a cleaner system than the polymeric based gels.

The gels of the present invention find utility as diverting agents or lost-circulation agents which aid in preventing loss of treating fluid into the natural fissures and cracks in the formation. Again, as opposed to polymeric gels, the gels of the present invention impart less damage to the formation and are easier to clean out of the formation upon completion of the treatment.

The gels of the present invention also find utility in reducing drag in pipelines. Pipeline drag reduction is discussed in U.S. Pat. No. 4,615,825 to Teot et al. incorporated by reference herein. Surprisingly, the surfactants of the present invention provide more shear stability and greater reduction in frictional forces than polymeric additives. In a preferred embodiment of the present invention, a salicylate is utilized as the counterion in the composition, providing excellent drag reduction.

The amount of surfactant and additive added to the aqueous fluid to reduce the friction as it passes through a conduit will depend on a variety of factors including the particular aqueous liquid, the surfactant chosen, as well as the type of additive chosen. In general, the concentration of the surfactant is preferably from about 0.01% to about 10% by weight of the fluid, and more preferably from about 0.05% to about 5%. The additive is preferably from about 0.1% to about 10% by weight of the total composition.

The gels of the present invention find utility in both coil-tubing and drilling operations which involve the circulation of the thickened fluids through wells. The primary function of the gels in this instance is to transport cuttings or other fine debris including the filtered proppant out of the well bore. The gels of the present invention provide excellent rheological properties for such applications, and contribute minimally to the friction pressure. The thickened fluids are reusable upon removal of the cuttings from the fluid. These applications are discussed in U.S. Pat. No. 4,735,731 to Rose et al. incorporated by reference herein.

In drilling operations, in addition to the transportation of cuttings, the compositions of the present invention also find utility as drilling fluids to maintain the integrity of the wellbore and to lubricate the drill bit. Typically in these drilling operations, the fluids are referred to as drilling mud.

The compositions of the present invention also find utility as completion fluids for drilling operations and for work over rigs. Viscosifiers are necessary in completion fluids in order to prevent too much water from filtering out into the porous surface of the formation, a phenomenon referred to in the industry as fluid loss. These viscosifiers are necessary both during the actual drilling process, and for preventing settling of the solids later on.

The completion fluids are typically heavy brine solutions having a density in the range of about 11 pounds per gallon (~1098 kg/m$^3$) to about 19 pounds per gallon (1896 kg/m$^3$) as compared to water which is about 8.32 lbs/gallon. The gelants of the present invention are excellent thickeners for these high salt concentration fluids. The resultant completion fluids exhibit excellent thermal stability of at least about 250° F. (about 120° C.) to about 350° F. (about 177° C.). For these completion fluids, a small amount of surfactant in an amount of about 0.5 wt-% to about 4 wt-% facilitates gel formation. Furthermore, the use of counterions, e.g. inorganic salts, organic salts, organic acids, alcohols, and so forth, is not necessary. However, a small amount of counterion may be desirable. If a counterion is used, the desirable range is about 0.10% to about 5%. The addition of the counterions can improve gel stability but the gelants of the present invention function without the presence of such counterions.

In a particular embodiment, sodium salicylate in an amount of less than about 0.2 wt-% was added in addition to the gelant.

Non-oil field applications include applications in the mining and metal cutting industries. The compositions of the present invention may also be used in the construction industry during excavation, digging, tunneling, drilling, and so forth. They may also be used for dust control. The compositions of the present invention may also be used in the masonry, cement and concrete industries.

The compositions of the present invention also find use as rheology modifiers, and may be used in household products including shampoos, detergents, cleaning products, and so forth.

The viscoelastic surfactants of the present invention also exhibit drag reducing properties.

EXAMPLES

KCl solution, 2% by weight, was stirred in a 500 ml stainless steel blender at an rpm of 200-300. To this solution, approximately 4 ml (~60% by weight concentration in ethylene glycol) of the quaternary ammonium salt (dimethylamidopropyltrimethyl ammonium chloride) was added to the KCl solution (forming a 3% by weight concentration of surfactant). Witconate® SXS, xylene sulfonate, was added (2 ml, ~40% concentration) and the resulting mixture was stirred for about 5 minutes at an rpm of 2000 to 3000 (Variact set at about 25). The resultant gel was defoamed using a sonicator and/or heating to 80° C. Rheological performance was evaluated using a model 50 rheometer (a Fann 50 Rheometer). The results may be found in the following tables.

The quaternary compound found in Table I has the following general structure:

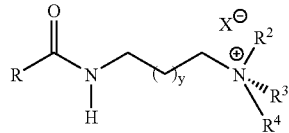

R is erucyl, (22 carbon, unsaturated fatty acid chain), $R^2$, $R^3$ and $R^4$ are each methyl, y is 1, and X is chloride. This compound will be referred to hereinafter as erucyl-DMAPA quat.

Preblending of the quaternary salt and the xylene sulfonate before addition to the water appeared to delay gel formation more than adding each ingredient to the water separately.

Example 1

TABLE 1

Rheological Performance of a Gelled Fluid

| Temperature ° F. | Viscosity | | |
|---|---|---|---|
| (° C.) | 40 sec$^{-1}$ | 100 sec$^{-1}$ | 170 sec$^{-1}$ |
| 80 (26.7) | 740 | 430 | 200 |
| 100 (37.8) | 745 | 435 | 215 |
| 125 (51.7) | 408 | 312 | 180 |
| 150 (65.6) | 274 | 150 | 100 |
| 175 (79.4) | 310 | 167 | 80 |
| 200 (93.3) | 247 | 170 | 76 |
| 225 (107.2) | 120 | 90 | 60 |
| 250 (121.1) | 60 | — | 27 |

Gel Composition: 2% KCL; 4% erucyl-DMAPA quat, 60% active (gelling agent); 2% Witconate® SXS (40% solution) sodium xylene sulfonate available from Witco Corp.

Example 1 illustrates the rheological performance of a viscoelastic gel of the present invention. The gels exhibits high viscosity at low shear rates thereby providing excellent proppant transportation and control of fluid penetration into the formation when the fluid is forced at high pressure into the fracture face.

Example 2

TABLE 2

Effect of Gellant Concentration on Viscosity

| Temperature ° F. | Viscosity (cPs) @ 100 sec$^{-1}$ | | |
|---|---|---|---|
| (° C.) | 2.5% gelant | 4% gelant (60% active) | 6% gelant |
| 80 (~27) | 260 | 430 | 590 |
| 100 (~8) | 215 | 435 | 600 |
| 125 (~52) | 142 | 312 | 542 |
| 150 (~66) | 70 | 150 | 283 |
| 175 (~79) | 77 | 167 | 231 |
| 200 (~93) | 80 | 170 | 182 |
| 225 (~107) | 61 | 90 | 100 |

The gel composition contained 2% KCL, 2% Witconate® SXS (40% solution), and erucyl-DMAPA quat gelant.

Example 2 illustrates the effect of the concentration of the gelant on the rheological performance of the fluid. The amount of gelant may be tailored to the physical characteristics of the geological formation such as temperature and permeability. For instance, a fluid with a high concentration of surfactant thereby providing higher viscosity, would find utility in a high temperature formation.

Example 3

TABLE 3

Effect of Chain Length of R on Stability

| No. of carbon atoms | Group | Stability |
|---|---|---|
| 22 | erucyl (unsaturated) | ~225° F. (~107° C.) |
| 22 | saturated $C_{22}$ | <150° F. (65.5° C.) |
| 18 | oleyl | <150° F. (65.5° C.) |
| 16 | palmityl | <150° F. (65.5° C.) |
| 12 | lauryl | weak gel |

*Each of the compositions contained 2% KCL; 4% gelant; and 2% Witconate® SXS.

Comparative Examples A and B

Comparative example A was composed of 2% KCL; 4% Kemamine® EX-300 erucyl-amine gelant; and 5 lbs sodium salicylate/1000 gallons. The heat stability was approximately 200° F. (~93° C.).

Comparative example B was composed of 2% KCL; 4% erucylamidopropylamine oxide (45% active) gelant; 2% Witconate® SXS; and 1% Adogen® 471. Comparative B had heat stability of <175° F. (79.4° C.).

Example 3 as compared to comparative examples A and B illustrates that surprisingly, comparable heat stabilities are being obtained with the gelants of the present invention as compared to commercially available gelants which are standards in the industry, even though the chemical structures are different.

Example 4

TABLE 4

Effect of Counter Ion Concentration on Gel Stability

| Temp ° F. (° C.) | Viscosity (cPs) @ 1000 $sec^{-1}$ | | | | |
|---|---|---|---|---|---|
| | 1% SXS | 2% SXS | 3% SXS | 4% SXS | 6% SXS |
| 80 (~27) | 300 | 430 | 360 | 370 | — |
| 100 (~38) | 220 | 435 | 340 | 400 | 285 |
| 125 (~52) | 250 | 310 | 220 | 200 | 170 |
| 150 (~66) | 230 | 150 | 150 | 166 | 105 |
| 175 (~79) | 150 | 165 | 145 | 115 | 75 |
| 200 (~93) | 110 | 170 | 90 | 90 | — |
| 225 (~107) | 80 | 90 | — | — | — |

*The gel composition was 2% KCl; 4% erucyl-DMAPA quat gelling agent (60% active); and Witconate® SXS (40% solution) varied as shown in Table 4.

Example 5

TABLE 5

Effect of Counter Ion Concentration on Gel Stability

| Temp ° F. (° C.) | Viscosity (cPs) @ 1000 $sec^{-1}$ | | | | |
|---|---|---|---|---|---|
| | 1% salicylate | 2% salicylate | 3% salicylate | 4% salicylate | 6% salicylate |
| 80 (~27) | 110 | 300 | 310 | 330 | 250 |
| 100 (~38) | 95 | 380 | 300 | 350 | 280 |
| 125 (~52) | 75 | 260 | 320 | 325 | 245 |
| 150 (~66) | 50 | 215 | 360 | 275 | 175 |
| 175 (~79) | — | 160 | 155 | 165 | 130 |
| 200 (~93) | — | 115 | 140 | 130 | 90 |

*The gel composition was 2% KCl; 4% erucyl-DMAPA quat gelling agent (60% active); and the concentration of the sodium salicylate counter ion (25% solution) varied as shown in Table 5.

Example 6

TABLE 6

Effect of Type of Counter Ion on Stability

| Counter Ion | Counter Ion Concentration | Stability |
|---|---|---|
| Witconate® SXS sodium xylene sulfonate (40% solution) | 2% | ~225° F. (~107° C.) |
| sodium salicylate (25% solution.) | 2% | ~200° F. (~93° C.) |
| Witconate® 1247H ammonium alcohol ether sulfonate | 0.6% | ~225° F. (~107° C.) |
| Witco® TX Acid (sodium salt, 20% soln) | 5% | ~210° F. (~99° C.) |
| sodium 3-hydroxy-2-naphthanoate | 4% | <150° F. (~65.5° C.) |
| sodium 2-amino-1-naphthalene sulfonate (10% soln.) | 4% | <150° F. (~65.5° C.) |

*Each of the compositions in Table 6 contained 2% KCl and 4% erucyl-DMAPA quat gelling agent (60% active). The sodium xylene sulfonate counter ion and the ammonium alcohol ether sulfate counter ion produced the most stable gels, while those counter ions having naphthalene groups decreased the stability of the gel. The amount of counterion utilized to aid in gel formation appears to be somewhat dependent on the size of the counterion, and the larger the counterion, the less required.

Example 7

TABLE 7

Effect of Substitution on the Amine on the Stability of the Gel

| $R^2$ | Stability |
|---|---|
| methyl | ~225° F. (~107° C.) |
| allyl | ~200° F. (~93° C.) |
| benzyl | ~150° F. (~65.5° C.) |
| vinyl benzyl | ~150° F. (~65.5° C.) |
| propylsulfonate | ~200° F. (~93° C.) |
| dihydroxypropyl | ~210° F. (~99° C.) |

*Each composition contained 2% KCl; 4% erucyl-DMAPA quat gelant (60% active); and 2% Witconate® SXS sodium xylene sulfonate counterion. $R^2$ was varied on the erucyl-DMAPA quat gelant. The smaller alkyl groups and the hydroxyalkyl groups appear to increase the stability of the gelled fluid.

Example 8

Example 8 illustrates the use of the gelant system of the present invention for use in a completion fluid. A completion fluid brine, 100 mL, was added to a blender fitted with a 200 mL stainless steel blender jar. Surfactant was added in amount of 4 wt-%. The resultant solution was stirred at low shear for (less than 1000 rpm) for 10 minutes. A erucyl-DMAPA quat gelling agent was added and each solution was heated at 75° F. (23.8° C.) for 1 hour. A counterion, sodium salicylate, was added to one solution in order to determine its effect on gel formation.

TABLE 8

| | Completion Fluids | |
|---|---|---|
| Brine Density (kg/m$^3$) | Gel Formation/Comments | Gel Stability at 121° C. |
| (1157) 11.6 lbs/gallon | *0.1875 wt-% sodium salicylate counterion. | not measured |
| (1507) 15.1 lbs/gallon | gel formed when heat was applied at 75° F. for 1 hour | stable |
| (1716) 17.2 lbs/gallon | gel formed rapidly at room temperature | stable |
| (1916) 19.2 lbs/gallon | gel formed at room temperature | stable |

*The gel composition was 4% gelant (2% active).

It can be noted that the gel formation time can be reduced for fluids less than 16 ppg when a counterion such as sodium salicylates are added. However, counterions are not necessary for the compositions of the present invention. For the gels which formed at room temperature, gel thickness could be increased with the addition of heat. In many instances, this is reversible.

The rheological performance of the completion fluid brine prepared with the completion fluid having a density of 19.2 lbs/gallon was determined. The viscosity was measured using a Fann 50 modified rheometer with a RiB5 configuration. The results are shown in Table 9 below.

TABLE 9

| Time (Min) | Temp ° F. (° C.) | visc @ 1 sec$^{-1}$ | n' | K (ind) | K' slot | R$^2$ | Calculated Viscosity (cP) @ 40 sec$^{-1}$ | 100 sec$^{-1}$ | 170 sec$^{-1}$ |
|---|---|---|---|---|---|---|---|---|---|
| 2 | 76 (~24) | — | 0.293 | 0.3868 | 0.4598 | 0.941 | 1622 | 848 | 583 |
| 40 | 95 (35) | 20237 | 0.282 | 0.3838 | 0.4564 | 0.992 | 1549 | 803 | 548 |
| 74 | 121 (~49) | 13274 | 0.364 | 0.2541 | 0.3003 | 0.990 | 1375 | 767 | 548 |
| 102 | 146 (~63) | 9327 | 0.384 | 0.1787 | 0.2107 | 0.990 | 1041 | 592 | 427 |
| 127 | 170 (~77) | 4495 | 0.480 | 0.0871 | 0.1010 | 0.974 | 710 | 441 | 335 |
| 150 | 195 (~90.5) | 2450 | 0.508 | 0.0476 | 0.0548 | 0.956 | 427 | 272 | 210 |
| 179 | 221 (105) | 2154 | 0.390 | 0.0414 | 0.0487 | 0.942 | 246 | 141 | 102 |
| 199 | 245 (~118) | 2421 | 0.250 | 0.0458 | 0.0544 | 0.902 | 164 | 82 | 55 |

The rheological performance of the completion fluid brine prepared with the brine solution having a density of 17.2 lbs/gallon was determined. The results are shown in the following Table 10.

TABLE 10

| Time (Min) | Temp ° F. (° C.) | visc @ 1 sec$^{-1}$ | n' | K (ind) | K' slot | R$^2$ | Calculated Viscosity (cP) @ 40 sec$^{-1}$ | 100 sec$^{-1}$ | 170 sec$^{-1}$ |
|---|---|---|---|---|---|---|---|---|---|
| 2 | 76 (~24) | 6900 | 0.466 | 0.1337 | 0.1554 | 0.996 | 1039 | 637 | 480 |
| 44 | 95 (35) | 6597 | 0.474 | 0.1280 | 0.1485 | 0.955 | 1023 | 632 | 478 |
| 79 | 120 (~49) | 13217 | 0.368 | 0.2533 | 0.2992 | 0.927 | 1394 | 782 | 559 |
| 108 | 146 (~63) | 18889 | 0.312 | 0.3600 | 0.4276 | 0.907 | 1618 | 862 | 598 |
| 133 | 170 (~77) | 8814 | 0.502 | 0.1715 | 0.1980 | 0.922 | 1512 | 958 | 736 |
| 156 | 195 (90.5) | 8194 | 0.412 | 0.1581 | 0.1855 | 0.904 | 1016 | 593 | 434 |
| 183 | 221 (105) | 13124 | 0.167 | 0.2474 | 0.2913 | 0.805 | 646 | 301 | 193 |
| 203 | 245 (~118) | 7117 | 0.316 | 0.1355 | 0.1608 | 0.939 | 617 | 330 | 229 |

The rheological performance of the completion fluid brine prepared with the brine solution having, a density of 15.1 was determined. The results are shown in the following Tables 11 and 12. The viscosity data found in Table 11 was determined using a Fann 50 rheometer.

As can be noted from the viscosity data, in particular the data collected from 118 minutes to 186 minutes, the viscosity increased with an increase in temperature. In contrast, most fluids exhibit a decrease in viscosity with increasing temperature.

TABLE 11

(viscosity measured using a Fann 50 Rheometer)

| Time (Min) | Temp °F. (° C.) | Visc @ 1 sec$^{-1}$ | n' | K (ind) | K' slot | R$^2$ | Calculated Viscosity (cP) @ 40 sec$^{-1}$ | 100 sec$^{-1}$ | 170 sec$^{-1}$ |
|---|---|---|---|---|---|---|---|---|---|
| 2 | 82 (~28) | 5069 | 0.339 | 0.0968 | 0.1147 | 0.976 | 479 | 261 | 184 |
| 33 | 96 (35.5) | 4989 | 0.319 | 0.0948 | 0.1126 | 0.957 | 438 | 235 | 163 |
| 65 | 121 (~49) | 5010 | 0.286 | 0.0950 | 0.1129 | 0.965 | 388 | 202 | 138 |
| 93 | 145 (~62) | 4991 | 0.272 | 0.0945 | 0.1124 | 0.966 | 367 | 188 | 128 |
| 118 | 171 (~77) | 2812 | 0.425 | 0.0542 | 0.0635 | 0.931 | 365 | 215 | 159 |
| 139 | 195 (90.5) | 4244 | 0.412 | 0.0818 | 0.0961 | 0.965 | 525 | 306 | 224 |
| 166 | 220 (~104) | 9391 | 0.259 | 0.1783 | 0.2120 | 0.916 | 660 | 335 | 226 |
| 186 | 245 (~118) | 11322 | 0.289 | 0.2154 | 0.2561 | 0.917 | 890 | 464 | 318 |

The viscosity data found in the following Table 12 was determined using a Constien & Associates Reciprocating Capillary Viscometer (RCV). The viscous properties are determined by displacing fluids at selected shear rates through a calibrated section of tubing. Flow direction is reversed at ⅓ of the tubing volume in order to maintain the fluid under shear for the entire test. Tubing and displacement accumulators are maintained at preselected temperatures in an oil bath. The entire system is pressurized at 200 psi. The shear rates are ramped at each temperature over about a 25 minute interval at rates of 3.4, 5.1, 6.8, 12.9, 25 and 50 sec$^{-1}$. The temperature is then raised and the shear rate is maintained at 97 sec$^{-1}$ while the temperature is equilibrating between ramping intervals. The fluid parameters n and K were determined using a Power Law Model.

TABLE 12

(viscosity measured using an RCV)

| Ramp Temp °F. (° C.) | n' | K (ind) | K' slot | R$^2$ | Calculated Viscosity (cPs) @ 1 sec$^{-1}$ | 40 sec$^{-1}$ | 100 sec$^{-1}$ |
|---|---|---|---|---|---|---|---|
| ambient | 0.458 | 0.061 | 0.071 | 0.910 | 3420 | 464 | 282 |
| 100 (~38) | 0.420 | 0.055 | 0.065 | 0.995 | 3091 | 364 | 214 |
| 125 (~52) | 0.375 | 0.059 | 0.070 | 0.992 | 3345 | 334 | 188 |
| 150 (65.5) | 0.294 | 0.069 | 0.082 | 0.984 | 3909 | 289 | 151 |
| 175 (~79) | 0.396 | 0.039 | 0.046 | 0.870 | 2193 | 236 | 136 |
| 200 (~93) | 0.380 | 0.096 | 0.113 | 0.999 | 5422 | 551 | 312 |
| 225 (~107) | 0.330 | 0.181 | 0.214 | 0.992 | 10258 | 865 | 468 |
| 250 (~121) | 0.429 | 0.161 | 0.189 | 0.995 | 9046 | 1100 | 652 |
| 275 (135) | 0.427 | 0.074 | 0.087 | 0.977 | 4175 | 504 | 298 |

The rheological performance of the 19.2 lb/gallon density completion fluid brine was measured with a Brook field viscometer (#2 Disc at 0.3 rpm). The results are found in the following Table 13.

TABLE 13

| Temperature | High Viscosity (cps) | Low Viscosity (cps) |
|---|---|---|
| 122° F. (50° C.) | 100,000 | 100,000 |
| 140° F. (60° C.) | 36,000 | 16,000 |
| 149° F. (65° C.) | 29,000 | 19,000 |
| 158° F. (70° C.) | 25,000 | 6,000 |
| 167° F. (75° C.) | 23,000 | 8,300 |
| 176° F. (80° C.) | 17,000 | 2,500 |

The completion fluid brine having a density of 15.1 lbs/gallon was tested for settling using the barite. The concentration of the erucyl-DMAPA quat was varied from 1% to 4%. The gelled fluid was mixed with the barite (37 grams per 150 mL of gel) in a covered graduated cylinder, and the amount of settling was observed at 100° C. The results are found in the following Table 14.

TABLE 14

| Erucyl-DMAPA quat concentration | % Settling |
|---|---|
| 4 wt-% (60% active) | none |
| 2 wt-% (60% active) | <1% |
| 1 wt-% (60% active) | <2% |

The results found in Table 13 indicate that the amount of settling improves as the amount of the gelant of the present invention is increased from 1 wt-% to 4 wt-%.

The invention claimed is:
1. A method of fracturing a subterranean formation comprising the steps of:
   I) providing a thickened aqueous based hydraulic fracturing fluid, comprising:
   a) an aqueous medium; and
   b) about 0.1 wt-% to about 4 wt-% of at least one cationic surfactant having the following general structure:

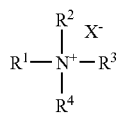

wherein $R^1$ is alkyl amine alkylene, or alkyl amido alkylene, $R^2$ and $R^3$ are each alkyl, hydroxyl alkyl, polyalkoxy with the degree of polymerization ranging from 2 to 30, hydroxyl alkyl sulfonate, alkyl sulfonate or alkylarylsulfonate; $R^4$ is hydrocarbon, saturated or unsaturated; or wherein any two of $R^2$, $R^3$ and $R^4$, together with the nitrogen atom to which they are attached, form a heterocyclic ring; and X is selected from the group consisting of: halides; oxo ions of phosphorus, sulfur or chloride; and organic anions; and c) at least one additive selected from organic salts, inorganic salts, organic acids, alcohols, and mixtures thereof; and II. pumping the aqueous fracturing fluid through a wellbore and into a subterranean formation at a pressure sufficient to fracture the formation.

2. The method of claim 1 wherein said cationic surfactant has the following general structure:

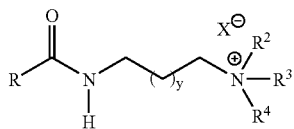

wherein R is saturated or unsaturated alkyl and y is an integer from 1 to 12.

3. The method of claim 2 wherein R has from about 6 to about 26 carbon atoms.

4. The method of claim 2 wherein R has from about 12 to about 22 carbon atoms.

5. The method of claim 2 wherein R is erucyl.

6. The method of claim 2 wherein y is 1.

7. The method of claim 2 wherein said cationic surfactant is isostearylamidopropylmorpholine.

8. The method of claim 1 wherein said fracturing fluid comprises at least one additive selected from organic acids, and/or organic salts.

9. The method of claim 8 wherein said additive comprises at least one aromatic group.

10. The method of claim 8 wherein said additive is an aromatic sulfonate.

11. The method of claim 1 wherein said aqueous based hydraulic fracturing fluid has thermal stability of greater than about 85° C.

12. The method of claim 1 wherein said additive is selected from sulfates, sulfonates, or salicylates.

13. The method of claim 1 wherein said gel has a thermal stability up to temperatures of about 110° C.

14. The method of claim 1 wherein said fracturing fluid has thermal stability of greater than about 90° C.

15. The method of claim 1 wherein said fracturing fluid comprises from about 0.05% to about 10% by weight of said cationic surfactant.

16. The method of claim 1 wherein said cationic surfactant is erucyl amidopropyltrimethyl ammonium quaternary salt, and said additive is sodium xylene sulfonate.

17. The method of claim 1 wherein in $R^1$, the alkyl group contains 1-26 carbon atoms and the alkylene group contains 1-8 carbon atoms.

18. An oil field high brine completion fluid comprising:
a) about 30 wt-% to about 70 wt-% of at least one inorganic or organic salt; and
b) about 0.1 wt-% to about 4 wt-% of at least one cationic surfactant having the following general structure:

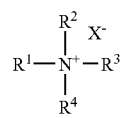

wherein $R^1$ is alkyl amine alkylene, or alkyl amido alkylene; $R^2$ and $R^3$ are each alkyl, hydroxyl alkyl, polyalkoxy with the degree of polymerization ranging from 2 to 30, hydroxyl alkyl sulfonate, alkyl sulfonate or alkylarylsulfonate; $R^4$ is hydrocarbon, saturated or unsaturated; or wherein any two of $R^2$, $R^3$, and $R^4$ together with the nitrogen atom to which they are attached, from a heterocyclic ring; and X is selected from the group consisting of: halides; oxo ions of phosphorous, sulfur or chloride; and organic anions.

19. The fluid of claim 18 further comprising at least one additive selected from inorganic salts, organic salts, organic acids, alcohols, or mixtures thereof.

20. The high brine completion fluid of claim 19 wherein said cationic surfactant is erucyl amidopropyltrimethyl ammonium quaternary salt, and said additive is sodium xylene sulfonate.

21. The fluid of claim 18 wherein the viscosity of said fluid increases when the temperature is increased and decreases when the temperature is decreased.

22. The completion fluid of claim 18 wherein in $R^1$, the alkyl group contains 1-26 carbon atoms and the alkylene group contains 1-8 carbon atoms.

23. A well drilling operation, coil-tubing operation, construction operation, or mining operation which comprises
suspending particles in a thickened aqueous liquid, the method comprising the steps of:
I) providing an aqueous medium; and
II) adding to said aqueous medium, an effective amount of at least one cationic surfactant and at least one additive sufficient to increase the viscosity of said aqueous medium wherein said cationic surfactant is erucyl amidopropyltrimethyl ammonium quaternary salt, and said additive is sodium xylene sulfonate, and
wherein said aqueous liquid is sufficiently thickened to suspend solid particulate matter, and wherein said particulate matter is cutting material, proppant material or mixtures thereof.

* * * * *